(12) United States Patent
Schuh et al.

(10) Patent No.: US 7,762,923 B2
(45) Date of Patent: Jul. 27, 2010

(54) SHIFT ASSISTED BRAKING FOR A POWER MACHINE OR VEHICLE

(75) Inventors: Scott N. Schuh, Fort Ransom, ND (US); Cody E. Franzen, Fairmont, MN (US); Gerald M. Berg, Lisbon, ND (US); Jeret L. Hoesel, Lisbon, ND (US); Walter K. Rolf, Lisbon, ND (US); Spencer L. Mindeman, West Fargo, ND (US); Timothy D. Hulm, Milnor, ND (US)

(73) Assignee: Clark Equipment Company, West Fargo, ND (US)

( * ) Notice: Subject to any disclaimer, the term of this patent is extended or adjusted under 35 U.S.C. 154(b) by 635 days.

(21) Appl. No.: 11/607,809

(22) Filed: Dec. 1, 2006

(65) Prior Publication Data

US 2008/0129109 A1    Jun. 5, 2008

(51) Int. Cl.
B60W 10/00     (2006.01)
(52) U.S. Cl. .......................................... 477/92; 477/94
(58) Field of Classification Search ................... 477/92, 477/94, 95; 192/220, 219, 219.5, 221
See application file for complete search history.

(56) References Cited

U.S. PATENT DOCUMENTS

| | | | | |
|---|---|---|---|---|
| 3,667,579 A | 6/1972 | Vizza | ............................... | 192/4 |
| 3,800,901 A | 4/1974 | Blomstrom et al. | | |
| 3,803,843 A | 4/1974 | Nyman et al. | ................... | 60/19 |
| 3,968,706 A * | 7/1976 | Bauer | ........................ | 74/471 R |
| 4,103,764 A | 8/1978 | Iijima | .............................. | 192/4 |
| 4,473,882 A | 9/1984 | Suzuki et al. | ............. | 364/424.1 |
| 4,608,873 A | 9/1986 | Redzinski | ..................... | 74/866 |
| 4,665,698 A | 5/1987 | Trusock | ......................... | 60/422 |
| 4,665,777 A * | 5/1987 | Kikuchi et al. | ................. | 477/93 |
| 5,154,267 A * | 10/1992 | Watts | .......................... | 192/220 |
| 5,203,235 A | 4/1993 | Iizuka | .......................... | 74/866 |
| 5,992,576 A * | 11/1999 | Berg et al. | ..................... | 188/69 |
| 6,173,228 B1 | 1/2001 | Carlson et al. | ................. | 701/51 |
| 6,250,433 B1 * | 6/2001 | Sealine et al. | .................. | 188/69 |
| 6,269,295 B1 | 7/2001 | Gaugush et al. | ............... | 701/55 |
| 6,349,253 B1 | 2/2002 | Bellinger | ...................... | 701/53 |
| 6,551,212 B2 | 4/2003 | Skinner et al. | ................. | 477/73 |
| 6,619,460 B1 | 9/2003 | Carlsson et al. | | |
| 6,979,280 B2 * | 12/2005 | Oshima et al. | .............. | 477/186 |
| 7,192,100 B2 * | 3/2007 | Berg | ........................... | 303/89 |

(Continued)

OTHER PUBLICATIONS

European Search Report from related European Application No. 07121091.8 filed Nov. 20, 2007.

*Primary Examiner*—David D Le
*Assistant Examiner*—Justin Holmes
(74) *Attorney, Agent, or Firm*—Westman, Champlin & Kelly, P.A.

(57) ABSTRACT

A shift assisted brake control system for a power machine or vehicle is disclosed. In illustrated embodiments, the shift assisted brake control system employs a shift assisted brake sequence. In illustrated embodiments, the shift assisted brake sequence shifts an operating speed of a hydrostatic transmission or motor from a high speed to a low speed upon activation of a brake switch or device. This reduces impact or wear to the brake mechanism. In illustrated embodiments, the transmission or motor remains at the low speed for a pause period and following the pause period, the transmission or motor is shifted to the high speed.

18 Claims, 9 Drawing Sheets

U.S. PATENT DOCUMENTS

| | | | |
|---|---|---|---|
| 7,223,206 B2 * | 5/2007 | Eriksson et al. | 477/188 |
| 2002/0100658 A1 * | 8/2002 | Williams et al. | 192/220 |
| 2006/0071541 A1 | 4/2006 | Berg | |
| 2006/0232124 A1 * | 10/2006 | Friederich et al. | 303/3 |

* cited by examiner

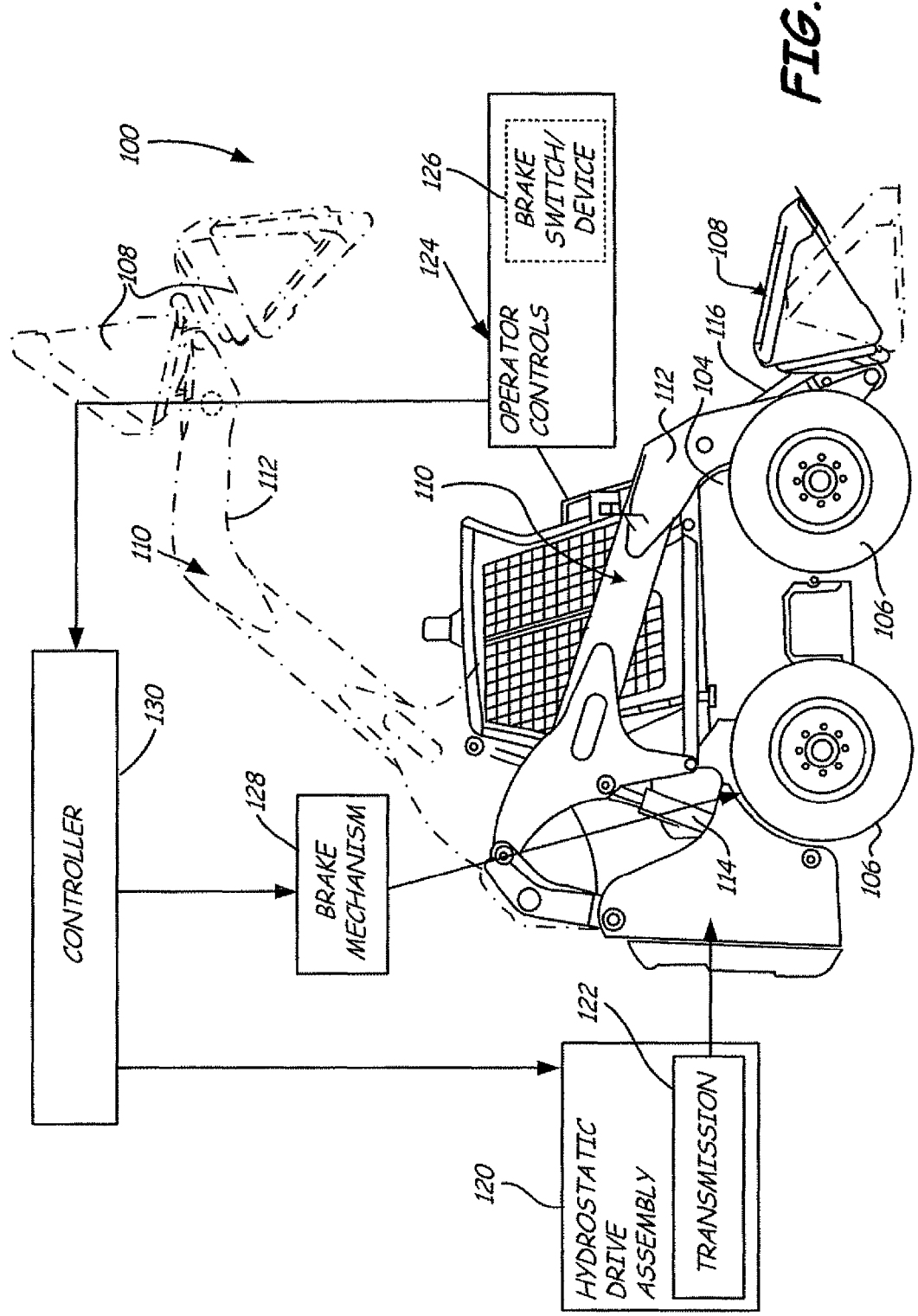

SHIFT ASSISTED BRAKING FOR A POWER MACHINE OR VEHICLE

FIELD OF THE INVENTION

The present invention relates to a brake system for a power machine or vehicle and in particular to a shift assisted brake system.

BACKGROUND OF THE INVENTION

Power machines, such as skid steer loaders are used for a wide variety of applications in different environments or sites. For example, power machines can be used at a building construction site or at a landscaping or highway construction site. Typically, the loader or machine is powered by a hydrostatic drive assembly. The hydrostatic drive assembly includes one or more pumps that supply fluid to one or more hydrostatic motors which generates torque to rotate a drive shaft or axle. The speed and direction of the vehicle or machine is controlled via the magnitude and direction of hydrostatic fluid flow. The magnitude and direction of fluid flow is controlled through various operator controls on the power machine, including for example, joysticks and/or other operating levers or controls. The operating controls also include a brake switch or device that activates a brake mechanism to restrict rotation of the drive shaft or axle to brake or stop the vehicle. Activation of the brake mechanism while the drive shaft or axle is rotating at high speeds can impart significant impact or wear to the brake mechanism or components.

SUMMARY OF THE INVENTION

The present invention relates to a shift assisted brake control system for a power machine or vehicle. In illustrated embodiments, the shift assisted brake control system employs a shift assisted brake sequence. In illustrated embodiments, the shift assisted brake sequence shifts an operating speed of a hydrostatic transmission or motor from a high speed to a low speed upon activation of a brake switch or device. This reduces the impact or wear to the brake mechanism. In illustrated embodiments, the transmission or motor remains at the low speed for a pause period and following the pause period, the transmission or motor is shifted to the high speed to reduce torque to the brake mechanism.

BRIEF DESCRIPTION OF THE DRAWINGS

FIG. 1 is a schematic illustration of components of a power machine or vehicle in which embodiments of the present invention are used.

DETAILED DESCRIPTION OF ILLUSTRATIVE EMBODIMENTS

Figure 2A:
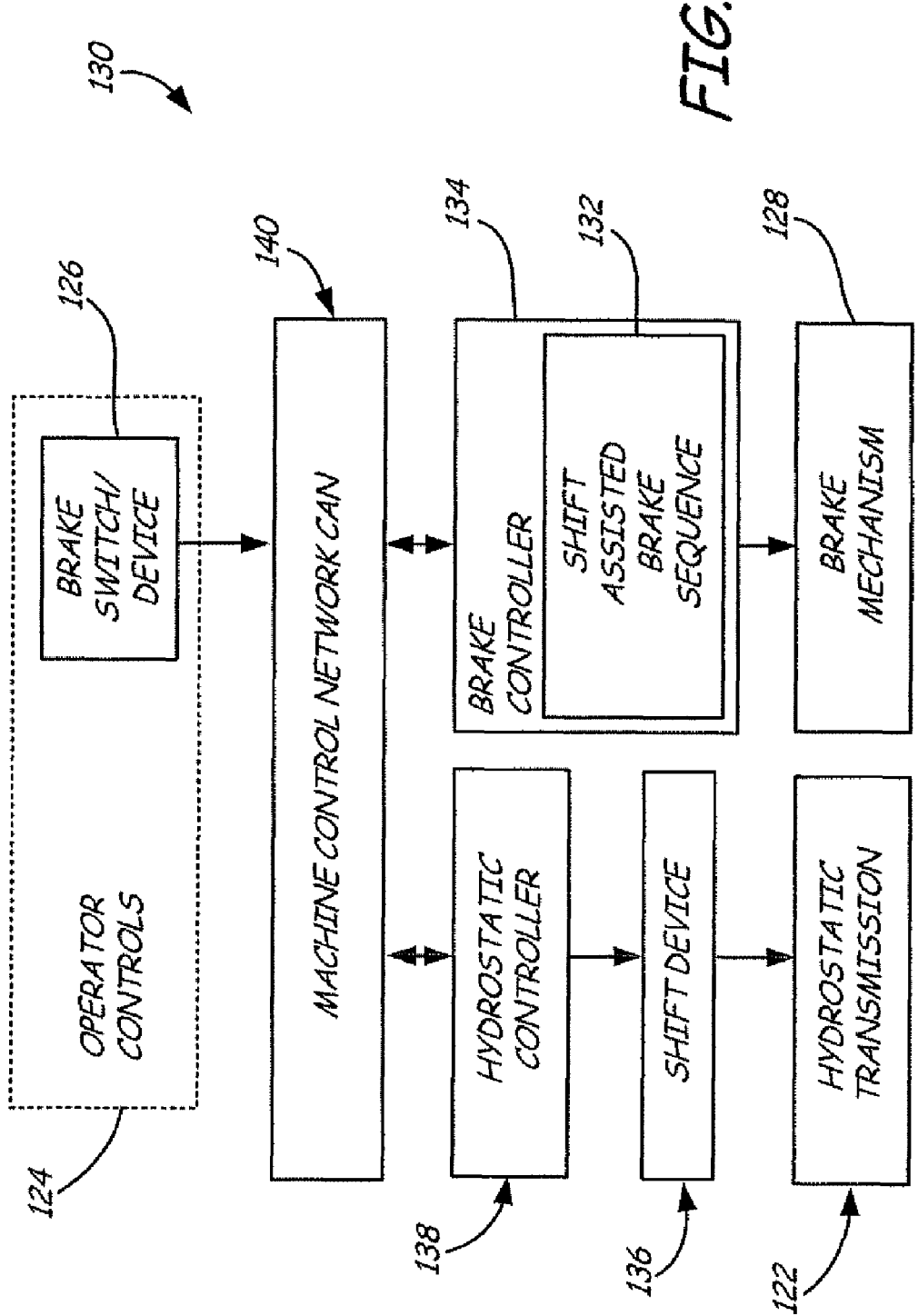
FIG. 2A is a block diagram of an illustrative embodiment of a control system for a power machine or vehicle of the type illustrated in FIG. 1 having a shift assisted braking sequence.

FIG. 1 illustrates an embodiment of a power machine or vehicle 100 in which embodiments of the present invention can be used. In the illustrated embodiment, the power machine 100 includes a frame 104 that is supported relative to a transmission (not shown in FIG. 1). Wheels 106 are coupled to the transmission so that the power machine 100 or vehicle can be driven over the ground during use. As shown, the power machine 100 also includes an implement or attachment 108 that is coupled to the frame 104 through a lift arm assembly 110. As shown, the lift arm assembly 110 includes lift arms 112 to raise and lower the implement or attachment 108. Lift arms 112 are raised and lowered via a lift cylinder or cylinders 114. The attachment or implement 108 is rotationally coupled to the lift arms 112 to adjust the tilt or orientation of the attachment or implement 108. In the illustrative embodiment, the orientation or tilt of the implement or attachment 108 is adjusted through a tilt cylinder 116 coupled to the implement or attachment 108. The lift and tilt cylinders 114, 116 are actuated through hydraulic circuitry not shown in FIG. 1.

In the illustrated embodiment, the power machine is driven or powered by a hydrostatic drive assembly 120 as schematically illustrated in FIG. 1. The hydrostatic drive assembly includes a hydrostatic transmission 122 that provides output torque to rotate wheels or one or more tracks of the power machine. The hydrostatic transmission 122 is configured to operate the vehicle in a forward or reverse direction based upon input from operator controls 124 illustrated schematically. The operator controls 124 allow the user to control vehicle speed and direction through various input buttons, levers and/or pedals as is generally known.

As shown, the operator controls 124 of the power machine or vehicle 100 include a brake switch or device 126 that activates a brake mechanism 128 to stop or restrict movement of the power machine or vehicle in response to activation of the brake switch or device 126. In the illustrated embodiment, the hydrostatic drive assembly 120, transmission 122 and brake mechanism 128 are electronically controlled through a machine controller 130 or other control device or network in response to input from the brake switch or device 126 and other operating controls 124.

FIG. 2A is a schematic illustration of a brake control assembly 130 which includes a shift assisted brake sequence 132 for actuating the brake mechanism 128 illustrated in FIG. 1. In the illustrated embodiment, the shift assisted brake sequence 132 is implemented through a brake controller 134 coupled to the brake mechanism 128. The brake sequence 132 is configured to shift the speed of the transmission assembly 122 to a low transmission speed upon activation of the brake switch device 126. The transmission 122 is shifted to the low speed through a shift device 136 under control of a hydrostatic controller 138. The brake controller 134 is illustratively a microcontroller or other programmable control device and is linked to the hydrostatic controller 138 through a controller area network or other control interface 140.

As schematically illustrated, the brake controller 134 is programmed or configured to implement the brake control sequence upon activation of the brake control or switch 126. In the brake control sequence, the transmission speed is shifted from a high speed to a lower speed prior to actuation of the brake mechanism 128. The brake control sequence also includes a pause or preset delay and following the pause or preset delay, the brake control sequence shifts the transmission speed from the low speed to the high speed.

Figure 2B:
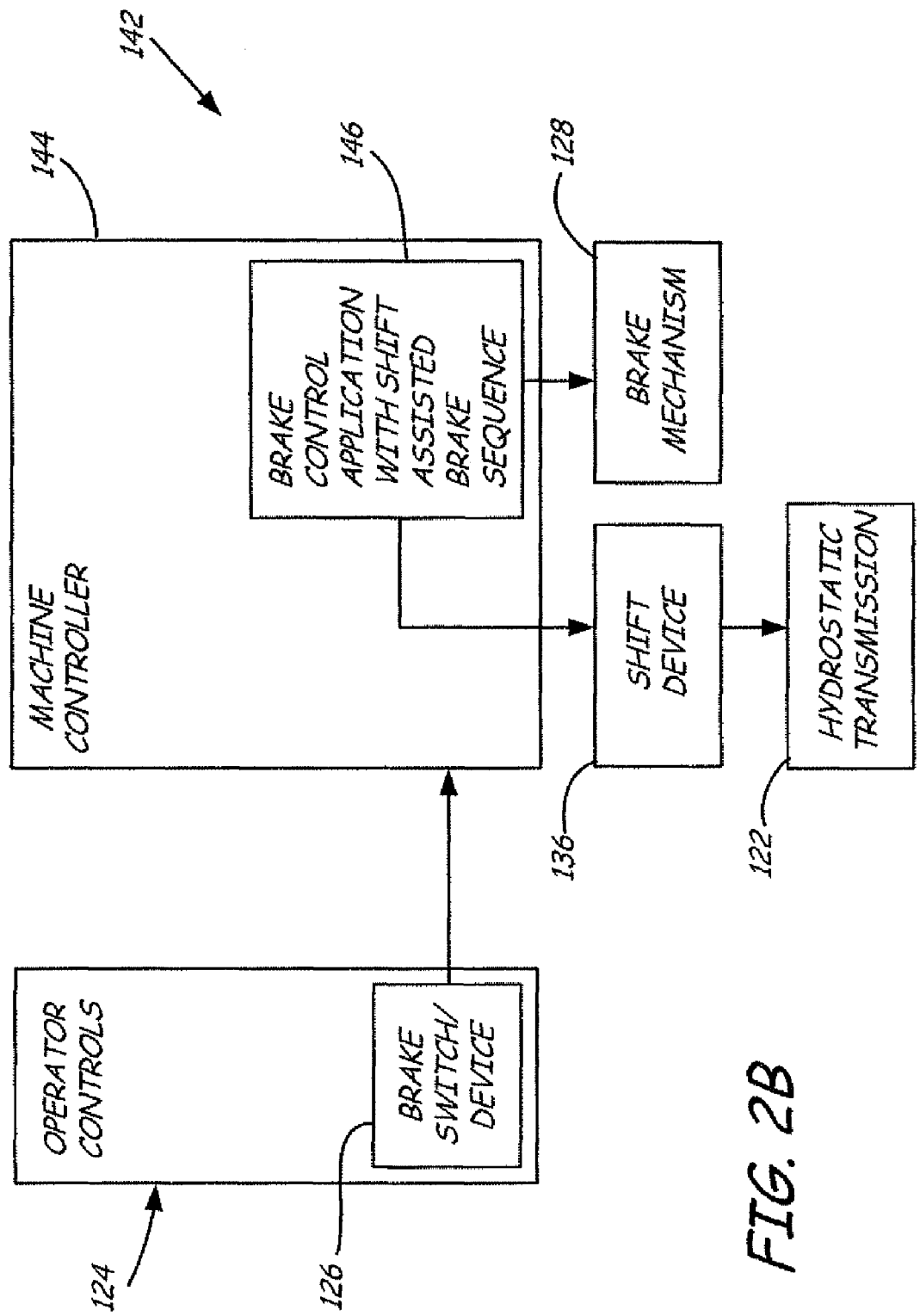
FIG. 2B is a block diagram of another embodiment of a control system for a power machine of the type illustrated in FIG. 1 having a shift assisted braking sequence.

FIG. 2B is a schematic illustration of an alternate embodiment of a brake control assembly 142 for implementing a shift assisted brake sequence. In the embodiment shown, the control assembly 142 includes a machine controller 144, which is configured to shift the transmission speed and actuate the brake mechanism 128. The machine controller 144 can be any programmable control or computer device. As illustrated schematically, the machine controller includes a brake control application 146, which is programmed or configured to implement the shift assisted brake sequence to slow the transmission speed prior to actuating the brake mechanism 128 as previously described in FIG. 2A.

Figure 3:
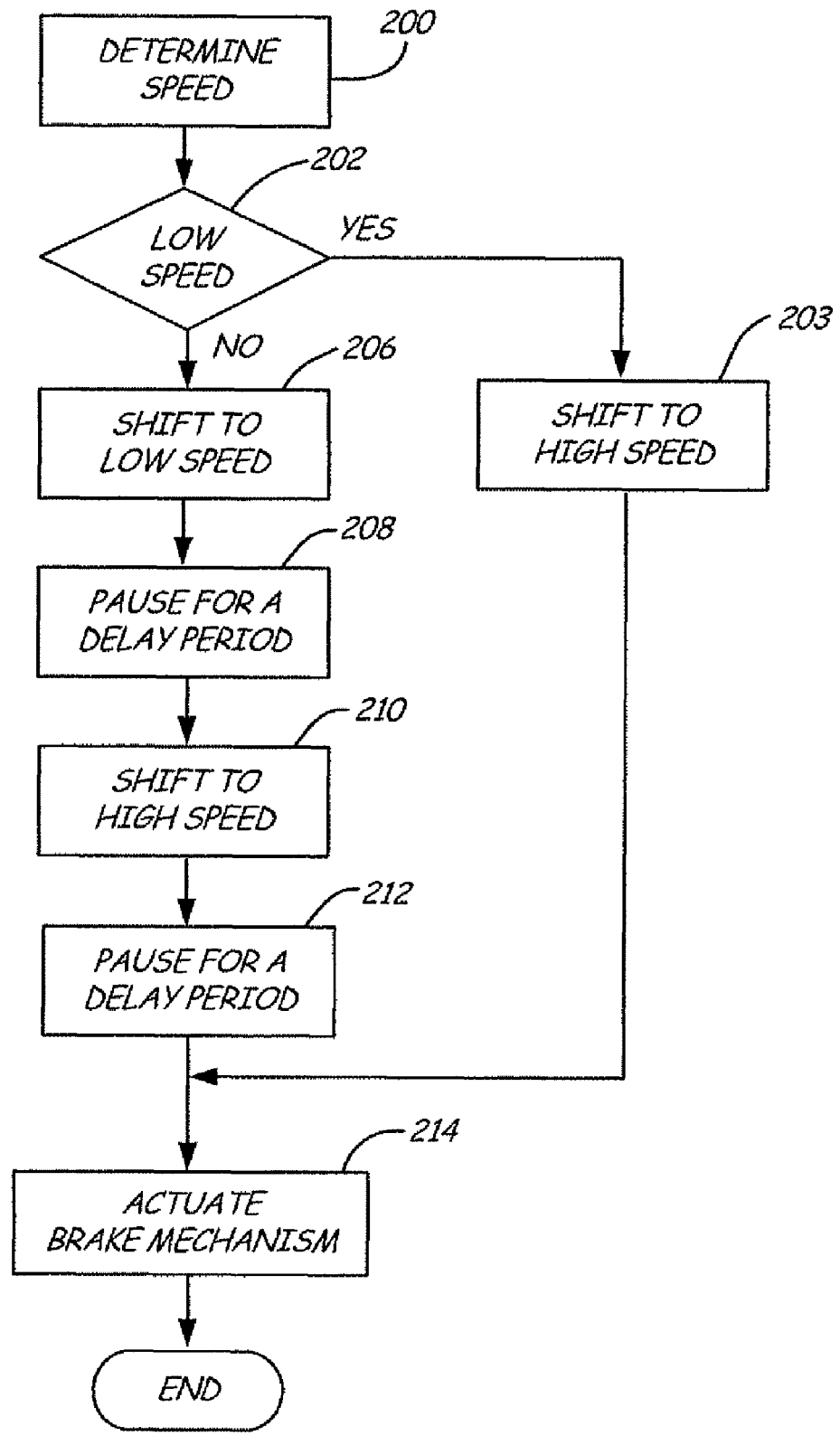
FIG. 3 is a flow chart illustrating a control sequence for an illustrated embodiment of a shift assisted brake control system.

FIG. 3 is a flow chart illustrating an embodiment of a shift assisted brake sequence for the embodiments illustrated in FIGS. 2A-2B. As shown, in step 200, the brake sequence is configured to determine the transmission speed upon activation of the brake switch or device 126. As illustrated by decision block 202, if the transmission speed is low, the transmission speed is shifted to a high speed in step 203 and the brake mechanism is actuated as illustrated in step 214. If the transmission speed is high, the transmission speed is shifted to a low transmission speed, (lower than the high speed) as illustrated in step 206. As shown in step 208, there is a pause for a delay period to allow the transmission speed of the hydrostatic drive assembly to reach a lower speed for activation of the brake mechanism 128. The pause is sufficient to slow the transmission speed to a lower or set speed to limit impact or wear on the brake mechanism or components 128. Illustratively, the pause period is approximately 2 seconds or less and is dependent upon different operating parameters of components of the drive or transmission assemblies. After the pause in step 208, the transmission speed is shifted from the low speed to a high speed. Following the shift to high speed in step 210 there is a pause for a delay period in step 212 and following the pause in step 212, the brake mechanism is actuated as illustrated in step 214.

Figure 3A:
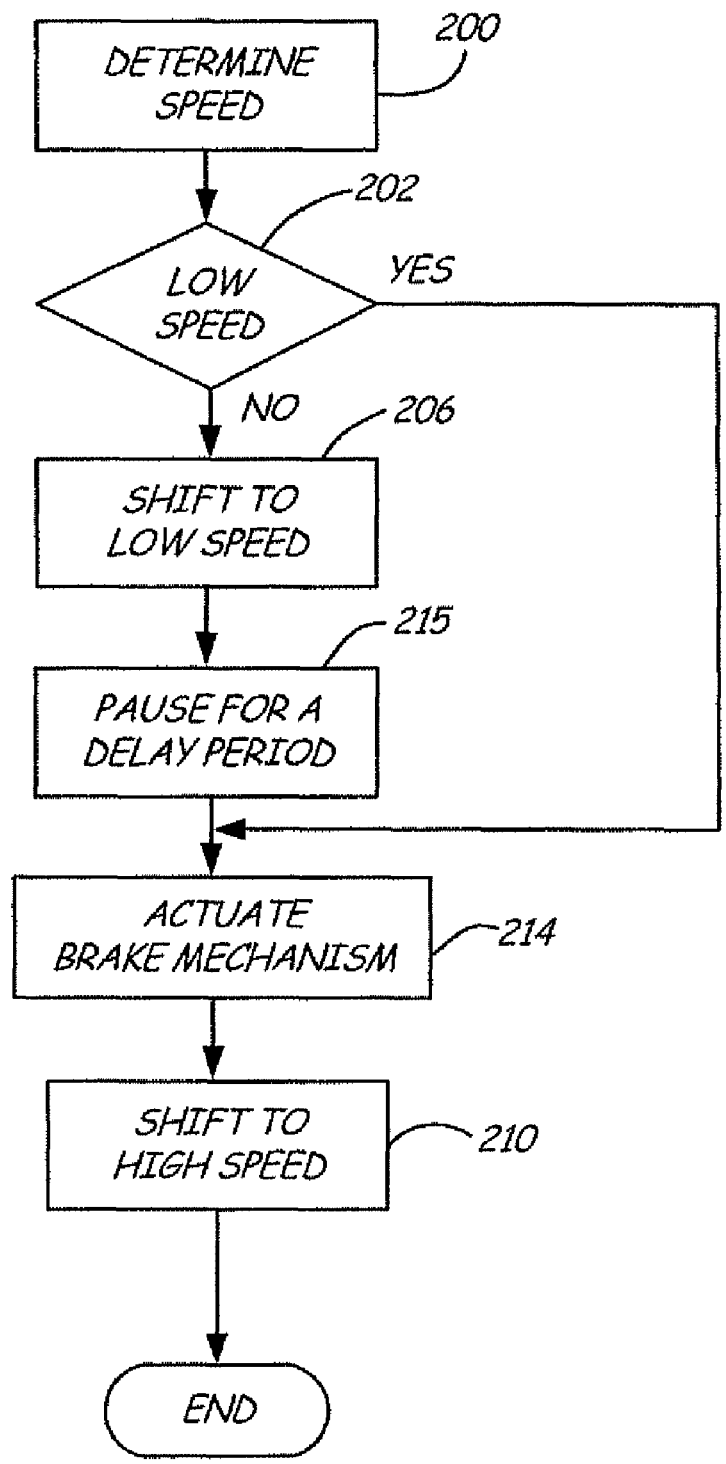
FIG. 3A is a flow chart illustrating an alternate control sequence for a shift assisted brake control system.

In an alternate embodiment illustrated in FIG. 3A, the brake mechanism 128 is actuated following step 206 and the transmission speed is shifted from the low speed to the high speed after the step of actuating the brake mechanism 128. Thus, if the transmission speed is high, the transmission speed is shifted to low speed in step 206 and then the brake mechanism 128 is actuated in step 214. In the particular embodiment shown, the brake mechanism 128 is actuated in step 214 following the pause in step 215. Thereafter, the transmission speed is shifted to high speed in step 210 following actuation of the brake mechanism 128. If the transmission speed is in low speed, the brake mechanism 128 is actuated in step 214 and thereafter the transmission speed is shifted from the low speed to the high speed in step 210. Although multiple brake control sequence embodiments are disclosed, application is not limited to the specific embodiments disclosed and other sequence steps or patterns can be employed as appreciated by those skilled in the art. For example, in another embodiment, the brake mechanism 128 is actuated as the speed is shifted to high speed.

Figure 4:
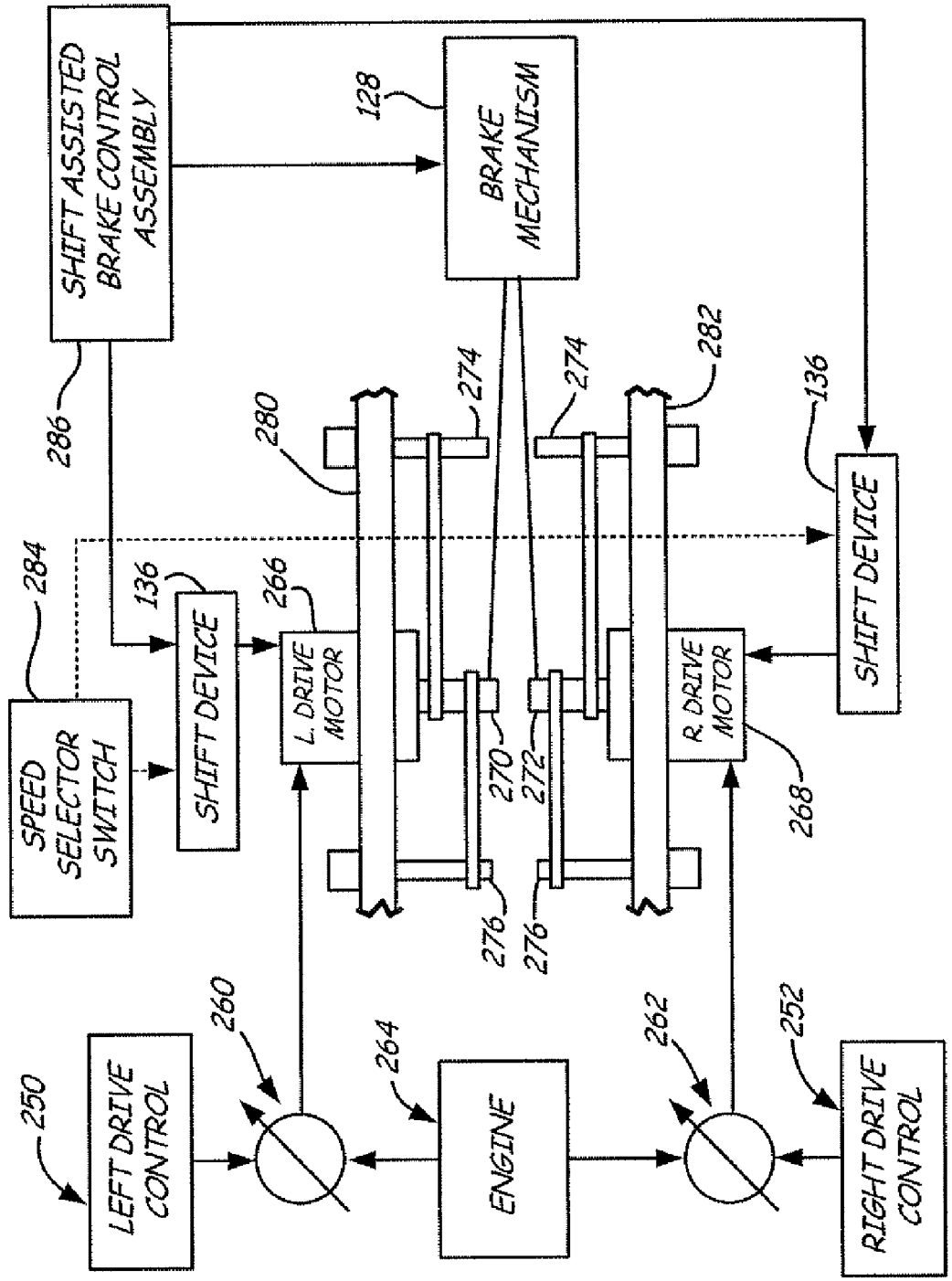
FIGS. 4-5 schematically illustrate embodiments of a hydrostatic drive assembly of a power machine including a shift assisted brake control system.
Figure 5:
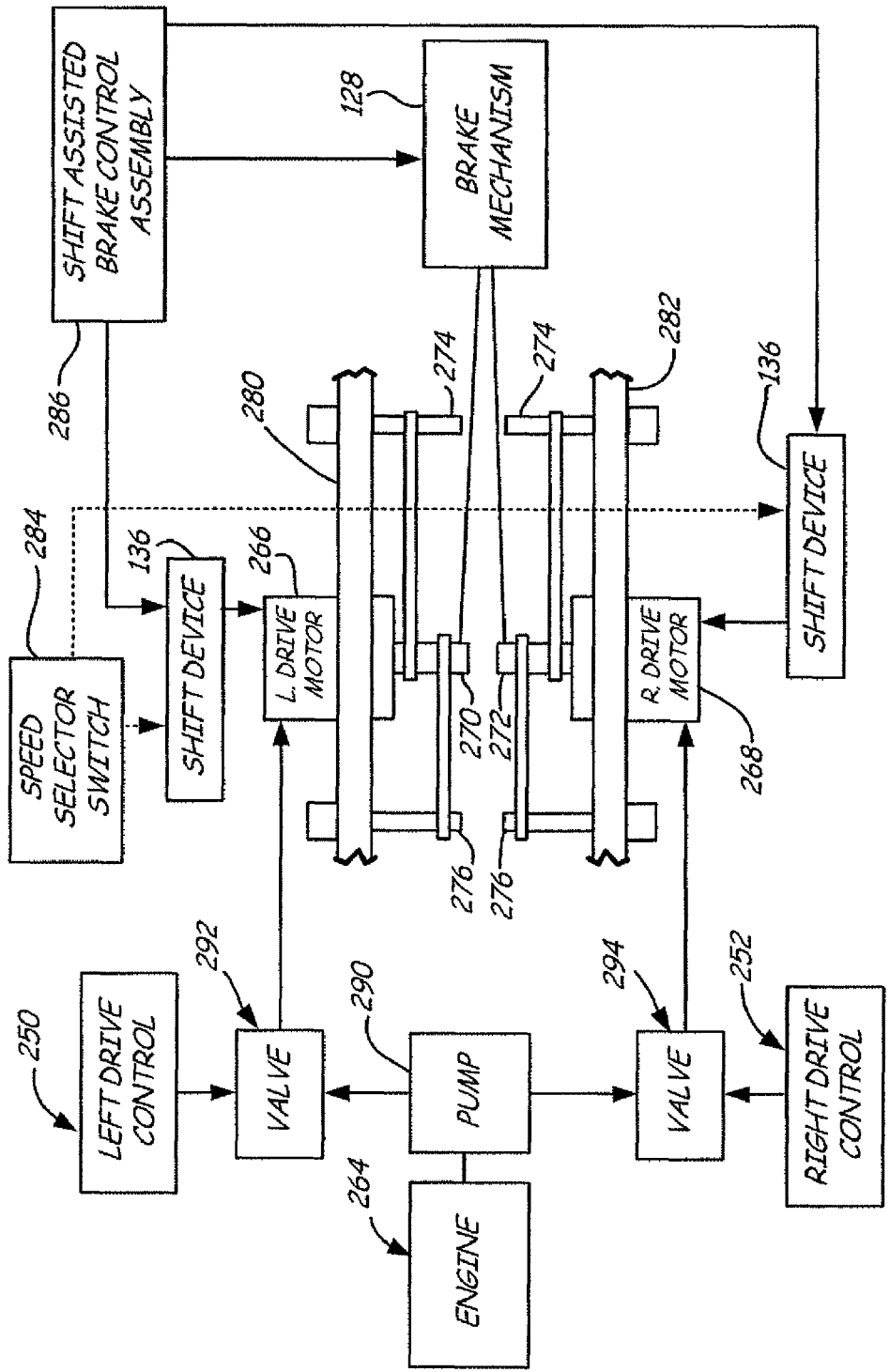

FIGS. 4-5 illustrate a hydrostatic drive assembly for a power machine or vehicle including a left hydrostatic transmission assembly and a right hydrostatic transmission assembly which cooperatively impart forward, reverse and steer motion to the power machine based upon input from left and right drive controls 250, 252. In the embodiment illustrated in FIG. 4, the left and right hydrostatic transmission assemblies include a left pump 260 and right pump 262 powered by engine 264 to supply hydrostatic fluid to a left hydrostatic motor 266 and a right hydrostatic motor 268, respectively. The left and right motors 266, 268 output power to rotate a left drive shaft 270 and right drive shaft 272, respectively. As shown rotation of the left and right drive shafts 270, 272 is transferred to front and rear axles 274, 276 of a power machine or vehicle mounted on left and right frame portions 280, 282 of the power machine. Clockwise and counterclockwise rotation is imparted to each of the left and/or right drive shafts 270, 272 to impart forward and reverse motion to the vehicle and a differential rotation is imparted to the left and drive right shafts 270, 272 to steer the vehicle or machine.

In the illustrated embodiment, the left and right pumps 260, 262 are variable displacement pumps having a variable displacement adjustable through a swashplate as is known by those skilled in the art. The swashplate is adjusted in response to input from the left and right drive controls 250, 252 to control the magnitude and direction of fluid flow to impart forward, reverse and steer motion to the power machine. In an illustrative embodiment, the left and right drive controls 250, 252 include left and right joysticks or other operating levers or controls. In one illustrative configuration, both the left and right joysticks are moved in a forward and an aft direction to impart forward and reverse motion to the power machine. Steer input is provided by forward or aft movement of one or either of the joysticks to drive or rotate shafts 270 and 272 depending upon the steer direction. Alternatively, forward, aft and steer movement can be imparted through a single joystick as is known by those skilled in the art.

In the illustrative embodiment of FIG. 4, the left and right motors 266, 268 are variable displacement motors. The displacement of the motors is adjusted to provide multiple motor speeds. As shown in FIG. 4, the motor speed is adjusted via the shift device 136, which is illustratively a valve assembly that adjusts or limits displacement or a swashplate that adjusts the stroke of the motors 266, 268. The motor speed is adjusted based upon input from a speed selector or device 284. In an illustrative embodiment, the speed selector or device 284 allows the user to select between a high speed and a low speed, although application of the present invention is not limited to a two speed motor.

The brake mechanism 128 is coupled to the left and right drive shafts 270, 272 to restrict rotation of the drive shafts 270, 272 to brake the vehicle or power machine. The brake mechanism 128 is actuated through a shift assisted brake control assembly 286 as schematically represented in FIG. 4. The brake control assembly 286 is configured or programmed to implement a shift assisted brake sequence which downshifts the motors 266, 268 from a high speed to a low speed upon activation of the brake switch or device 126 as previously described. In an illustrated embodiment, the shift assisted brake sequence is implemented by a motor controller or controllers (not shown in FIG. 4) through a networked interface with a brake controller as illustrated in FIG. 2A or alternatively through a brake control application of a machine controller or control device as shown in FIG. 2B.

FIG. 5 illustrates an alternate embodiment of a hydrostatic drive assembly similar to FIG. 4 including a shift assisted brake control assembly 286 where like numbers refer to like numbers in the previous FIGS. In the embodiment illustrated in FIG. 5, the drive speed and direction of the vehicle is adjusted by adjusting fluid flow from pump 290 to the right and left hydrostatic motors 266, 268 through operation of valves 292, 294. As previously described, the brake mechanism 128 is controlled via the shift assisted brake control assembly 286 having a shift assisted brake sequence as previously described to slow rotation speeds of the drive shafts 270, 272 for braking.

Figure 6:
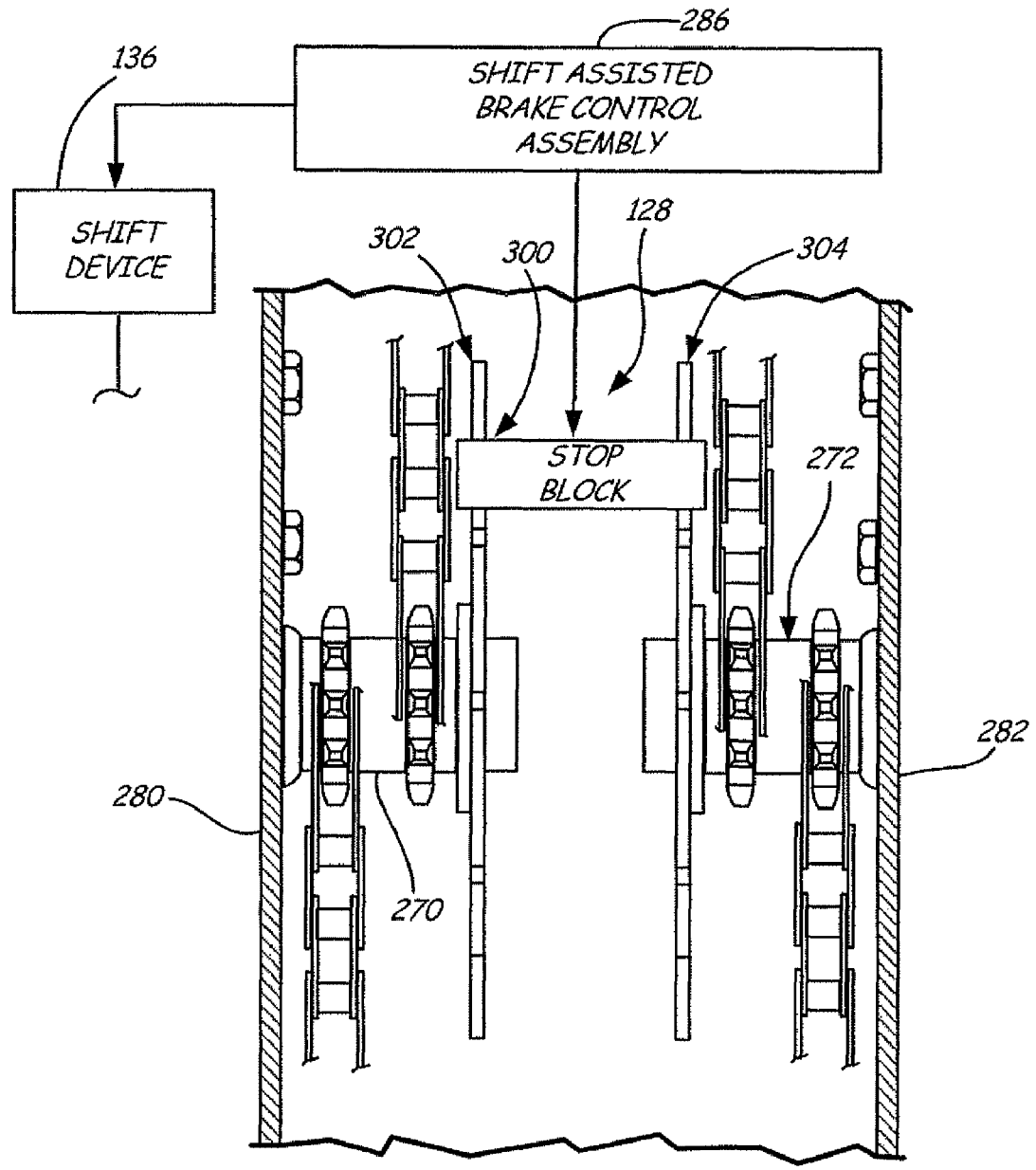
FIG. 6 is a top view of a drive shaft and an illustrative embodiment of a brake mechanism for restricting rotation of the drive shaft to brake a power machine or vehicle of the type illustrated in FIG. 1.
Figure 7:
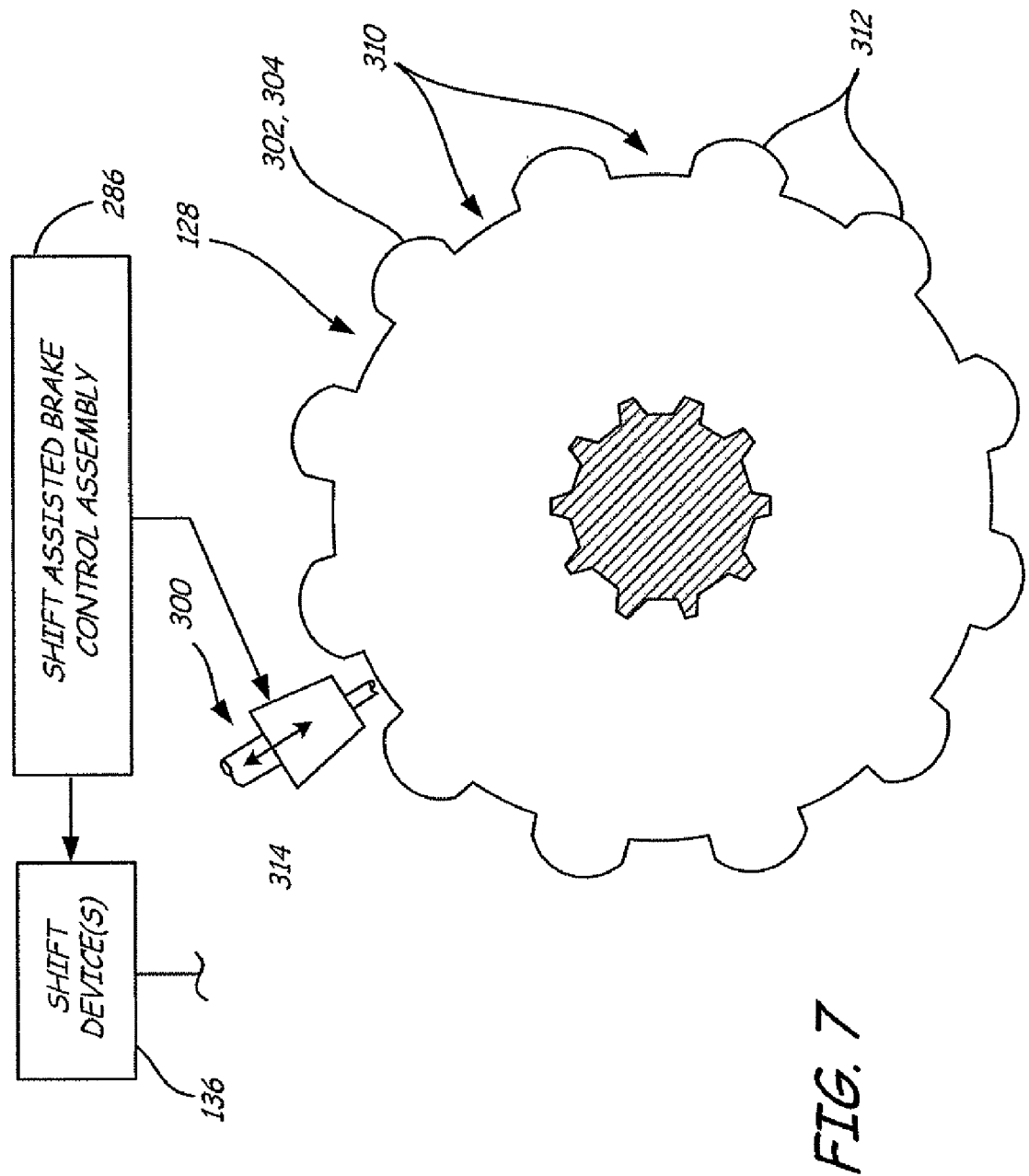
FIG. 7 is a side view of a disc and wedge shaped plunger of an illustrative embodiment for the brake mechanism illustrated in FIG. 6.

FIGS. 6-7 illustrates an embodiment of the brake mechanism 128 activated by embodiments of the shift assisted brake control systems or sequence disclosed herein, where like numbers are used to refer to like parts in the previous FIGS. As shown, the brake mechanism 128 is a lock or parking brake mechanism having a stop block 300 illustrated diagrammatically in FIG. 6. The stop block 300 is actuated to engage discs 302, 304 on the rotating drive shafts 272, 274 as shown in FIG. 6. Discs 302, 304 are coupled to the drive shafts 272, 274 that are rotated via the left and right motors 266, 268 (not shown in FIG. 6). In the illustrated embodiment, the stop block 300 is actuated to engage both discs 302, 304 to impede rotation of the discs and thereby restrict rotation of the drive shafts 272, 274 to stop the vehicle.

In an alternate embodiment, the brake mechanism includes separate stop blocks for each disc 302, 304. The separate stop blocks are cooperatively actuated to restrict rotation of the drive shafts 272, 274. The separate stop blocks can be actuated through separate brake control devices or a single control device as will be appreciated by those skilled in the art.

In particular, as shown in FIG. 7, the rotating discs 302, 304 (only one is shown in FIG. 7) include a plurality of gaps 310 formed between a plurality of lugs 312 spaced about an outer circumference of the discs 302, 304. As shown in FIG. 7, the stop block 300 includes an elongate wedge shaped plunger 314 which is movable between a retracted position spaced from the discs 302, 304 and a braking position engaging the discs 302, 304 via a solenoid or other actuator device (not shown). In the braking position, the wedge shaped plunger 314 is seated in one of the plurality of gaps 310 formed between adjacent lugs 312 to restrict rotation of one or both discs 302, 304 to stop movement of the vehicle or machine.

Prior to braking, one or both of the discs 302, 304 may be rotating at a high RPM or speed such that there is not sufficient time for the wedge shaped plunger 314 to drop into the gap 310 between adjacent lugs 312. If the discs 302, 304 are rotating too fast, the wedge shaped plunger 314 will ride across the tops of the lugs 312 on the discs and will not engage the lugs 312 to stop rotation of the drive shafts 270, 272. As previously described actuation of the wedge shaped plunger 314 is controlled by the shift assisted brake control assembly 286 having a shift assisted braking sequence to provide a slow rotation speed prior to actuation of the wedge shaped plunger 314.

As described, in the illustrated embodiments, prior to actuating the wedge shaped plunger 314, the speed of motor 266, 268 is shifted from a high speed to a low speed to slow the motor speed. Thereafter, the wedge shaped plunger 314 is actuated to engage one of the plurality of lugs 312 on the discs 302, 304 to stop the machine or vehicle. In one embodiment described, the speed of the motors 266, 268 is shifted from the low speed to a high speed prior to actuation of the wedge shaped plunger 314 to dissipate power generated during the braking sequence. In an alternate embodiment, the wedged shaped plunger 314 is actuated prior to the step of shifting the motor speed from the low speed to the high speed as previously described.

Although the present invention has been described with reference to preferred embodiments, workers skilled in the art will recognize that changes may be made in form and detail without departing from the spirit and scope of the invention. For example, application of the illustrated embodiments is not limited to a wheeled vehicle illustrated in FIG. 1 and the illustrated embodiments can be adapted for use on a track vehicle or alternatively, the brake control sequence can be implemented through alternate control systems and application is not limited to the specific embodiments disclosed.

What is claimed is:

1. A brake assembly comprising:
   a brake mechanism coupled to a drive shaft rotated via a transmission assembly; and
   a brake control assembly configured to actuate the brake mechanism to restrict rotation of the drive shaft and the brake control assembly configured to implement a brake control sequence in response to brake input from operator controls wherein when the transmission assembly is operating at a high speed, the brake control sequence shifts from the high speed to a low speed prior to actuating the brake mechanism and after a delay period following the shift from the high speed to the low speed shifts the transmission speed from the low speed to the high speed.

2. The brake assembly of claim 1 wherein the brake control sequence shifts the transmission assembly from the low speed to the high speed prior to actuating the brake mechanism or following actuation of the brake mechanism.

3. The brake assembly of claim 1 wherein the brake control assembly includes a programmable control device programmed to implement the brake control sequence in response to the brake input from the operator controls.

4. The brake assembly of claim 3 wherein the programmable control device is a brake controller or device programmed to implement the brake control sequence through a controller area network.

5. The brake assembly of claim 1 wherein the transmission assembly includes one or more hydrostatic motors configured to receive fluid flow from one or more hydrostatic pumps to generate torque to rotate the drive shaft wherein a speed of the one or more hydrostatic motors is shifted to shift the transmission assembly from the high speed to the low speed and from the low speed to the high speed.

6. The brake assembly of claim 1 wherein the brake mechanism is actuated following a pause delay after the transmission speed is shifted from the low speed to the high speed.

7. A brake assembly comprising:
   a brake mechanism coupled to a drive shaft rotated via a transmission assembly including a motor assembly configured to receive fluid flow from a pump and having a motor speed operable at a high speed and a low speed; and
   a brake control assembly including a control device configured to actuate the brake mechanism in response to brake input from operator controls and the control device including a control sequence configured to shift the motor speed of the motor assembly operating at the high speed from the high speed to the low speed in response to the brake input to slow rotation of the drive shaft and the control sequence is configured to shift the motor speed from the low speed to the high speed prior to or following actuation of the brake mechanism wherein if the motor assembly is operating at the high speed, the control sequence is configured to shift from the low speed to the high speed following a delay after shifting from the high speed to the low speed in response to the brake input.

8. The brake assembly of claim 7 wherein the motor speed is adjusted by adjusting a stroke or displacement of the motor assembly.

9. The brake assembly of claim 7 wherein the control sequence is configured to actuate the brake mechanism after a pause delay following the shift of the motor speed from the low speed to the high speed.

10. The brake assembly of claim 7 wherein the control device is a programmable device coupled to the brake mechanism and configured to shift the motor speed of the motor assembly through a controller area network.

11. The brake assembly of claim 7 wherein the brake mechanism includes a disc coupled to the drive shaft and rotatable therewith and the disc having a plurality of lugs spaced about the circumference of the disc and the brake mechanism including a stop block or plunger which is actuatable between a retracted position spaced from the plurality of lugs and an engaged position between adjacent lugs to restrict the rotation of the drive shaft.

12. A method comprising the steps of:
   receiving a brake input;
   determining a transmission speed of a transmission assembly in response to the brake input;
   shifting the transmission speed from a high speed to a low speed in response to the brake input prior to actuating a brake mechanism and shifting the transmission speed from the low speed to the high speed after a delay period if the transmission speed is high; and
   shifting the transmission speed from the low speed to the high speed if the transmission speed is low.

13. The method of claim 12 wherein the steps of shifting the transmission speed from the high speed to the low speed and from the low speed to the high speed comprises the step of:
   adjusting a stroke or displacement of a hydrostatic motor to shift the transmission speed from the high speed to the low speed and adjusting the stroke or displacement to shift the motor speed from the low speed to the high speed.

14. The method of claim 12 and further comprising the step of:
   actuating the brake mechanism after a pause delay following the step of shifting the transmission speed from the low speed to the high speed or actuating the brake mechanism prior to the step of shifting the transmission speed from the low speed to the high speed.

15. The method of claim 14 wherein the step of actuating the brake mechanism comprises:
   moving a stop block or plunger from a retracted position to an actuated position to engage one of a plurality of lugs spaced about a circumference of a disc coupled to a drive shaft of the transmission assembly to restrict rotation of the drive shaft.

16. A brake assembly comprising:
   a brake mechanism coupled to a drive shaft rotated via a transmission assembly wherein the transmission assembly includes a motor assembly having a motor speed operable at a low speed and a high speed higher than the low speed and the brake mechanism actuatable to brake the drive shaft; and
   a brake control assembly including a brake control sequence configured to shift the motor assembly from the low speed to the high speed in response to a brake input from operator controls prior to or following actuation of the brake mechanism wherein if the motor assembly is operating at the high speed the brake control sequence first shifts the motor assembly from the high speed to the low speed in response to the brake input and the control sequence operates the motor assembly at the low speed for a delay period prior to shifting the motor assembly from the low speed to the high speed.

17. The brake assembly of claim 16 wherein the control sequence is configured to actuate the brake mechanism prior to shifting the motor speed of the motor assembly from the low speed to the high speed.

18. The brake assembly of claim 16 wherein the control sequence is configured to actuate the brake mechanism after shifting the motor speed of the motor assembly from the low speed to the high speed.

* * * * *